Jan. 8, 1935.  A. L. EDWALL  1,987,551
BAND SAW
Filed Nov. 11, 1932   2 Sheets-Sheet 1
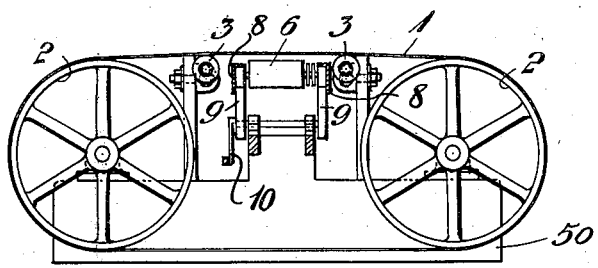
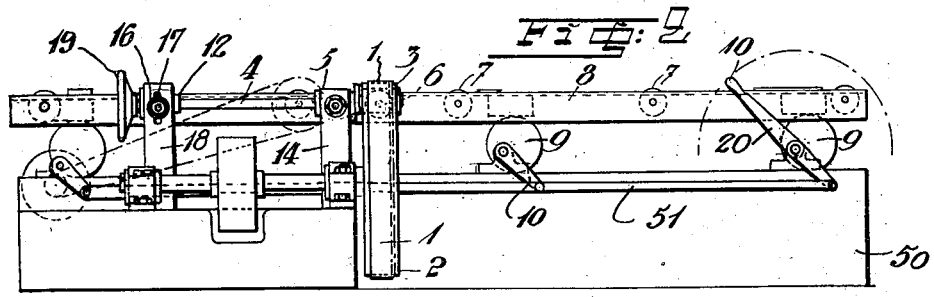
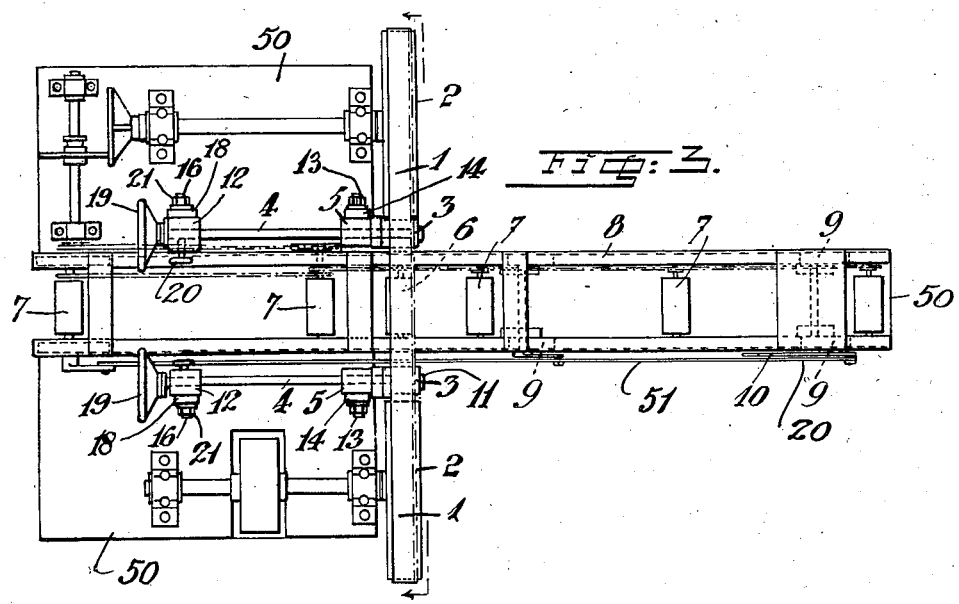
A. L. Edwall
INVENTOR
By Marks & Clerk
Attys.

Jan. 8, 1935.  A. L. EDWALL  1,987,551
BAND SAW
Filed Nov. 11, 1932  2 Sheets-Sheet 2
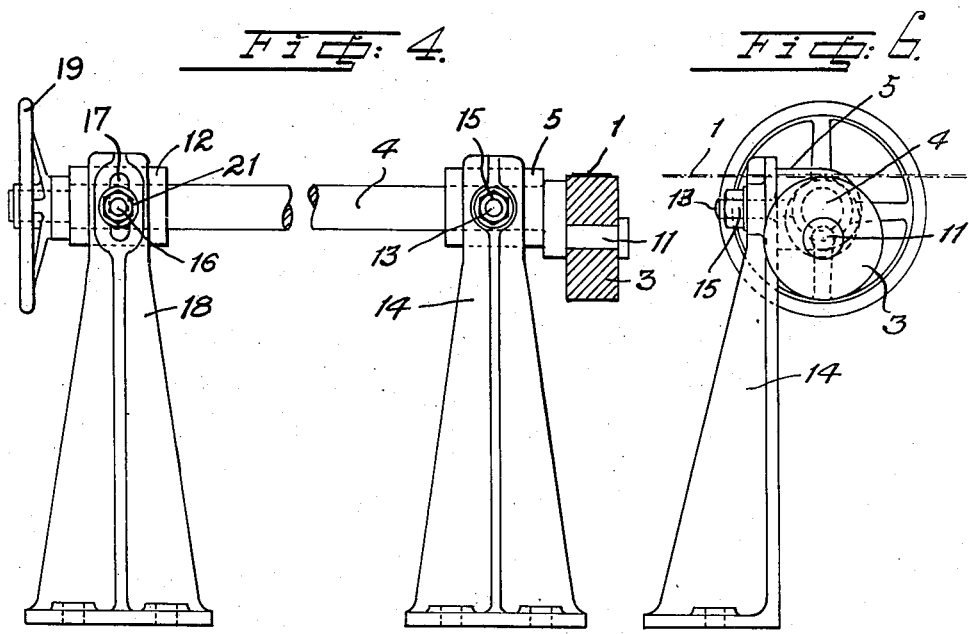
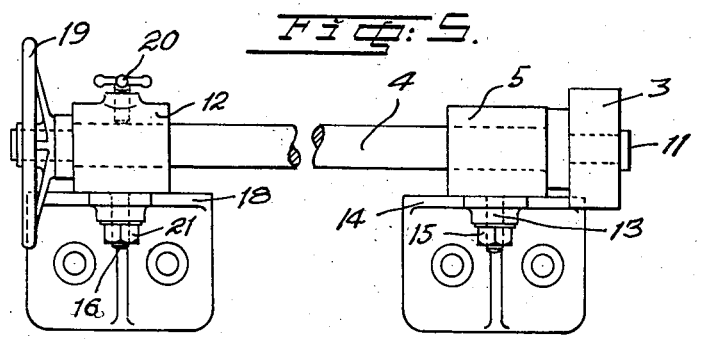
A. L. Edwall
INVENTOR
By Marks & Clerk
ATTYS.

Patented Jan. 8, 1935

1,987,551

UNITED STATES PATENT OFFICE 1,987,551

BAND SAW

Axel Laurentz Edwall, Overbyn, Brunflo, Sweden

Application November 11, 1932, Serial No. 642,312
In Sweden July 31, 1931

3 Claims. (Cl. 143—19)

This invention relates to improvements in band saws of that type in which the endless blade is carried by pulleys in a path of travel to engage the material fed forward to be cut by the blade. It has for its object the provision of tensioning means whereby adjustable pressure can be applied to a stretch of the blade between the two pulleys and on opposite sides of the travel of the material being cut. The construction of the tensioning means is such that the pressure can be applied to maintain the cutting blade in a plane parallel to the path of travel of the work. The mechanism employed for carrying out the invention is described in detail herein, pointed out in the appended claims and illustrated by the accompanying drawings.

In the accompanying drawings, in which similar reference characters designate corresponding parts, Figures 1, 2 and 3 are, respectively, end (partly in section), side and plan views of a band saw embodying the invention, only so much of the band saw being shown as is necessary to illustrate the application of the tensioning device.

Figures 4, 5 and 6 are detail views, showing one of the tensioning rollers, the mounting therefor, and the means for adjusting the roller.

Referring to the drawings in detail, 1 designates the endless blade carried by the opposite pulleys 2 suitably mounted on a supporting base 50. Mounted on the supporting base between the pulleys and extending beneath the upper stretch of the endless blade is the table on which are placed the logs to be fed to the blade. This table comprises the side frames 8 with the rollers 6 and 7 journaled between said frames, the roller 6 being positioned directly beneath the blade. These rollers are rotated by any suitable mechanism for feeding the log placed thereon toward the blade. Interposed between the table and the supporting base are the eccentric cams 9, actuated by the crank-arms 10, for vertical adjustment of the table. The crank-arms are connected by a common link 51 to the control lever 20 for uniform adjustment of the cams. The foregoing mechanism is well known and need not be further described in detail.

Mounted on the base support 50 are two tensioning devices, one on each side of the feed table and adjacent to the travel of the endless blade. Each tensioning device comprises a standard 14, to the upper end of which is horizontally pivoted the bushing 5 by the bolt 13 extending through the standard. A nut 15 on the outer end of the bolt serves to clamp the bushing to the standard. Journaled at one end in the bushing 5 is the shaft 4. On the end of the shaft is a crank including the wrist-pin 11 on which is journaled the roller 3 to bear against the under side of the upper stretch of the endless blade. The other end of the shaft 4 is journaled in a bushing 12 horizontally pivoted to the upper end of the standard 18 mounted on the base 50. The bushing 12 is pivoted to the standard 18 by the bolt 16 extending through the slot 17 in the upper end of the standard. A nut 21 on the outer end of the bolt 16 serves to clamp the bushing to the standard. By loosening the nut 21 the shaft 4 can be angularly adjusted on its pivot 13 within the limits controlled by the length of the slot 17. On the extreme outer end of the shaft 4 is the hand-wheel 19 for rotating the shaft to revolve the crank including the wrist-pin 11 carrying the roller 1. A set-screw 20 threaded through the wall of the bushing 12 can be turned to hold the shaft against rotation.

In tensioning the endless blade both of the tension devices are employed. To accomplish this purpose, the set-screw 20 of each device is loosened and by means of the hand-wheel 19 the shaft 4 is rotated to displace angularly the wrist-pin 11 so that the roller 3 is pressed against the blade to increase the tension to the required extent. Both rollers 3, by their respective mechanism, are adjusted to the same extent so that the travel of the upper stretch of the blade is maintained in a plane parallel to the plane of the feed table. By tightening the set screws 20 the shafts 4 can be held in their adjustments. Owing to defective grinding and irregular setting of the teeth the blade may tend to travel in a biased direction. To correct this biased tendency, either or both of the rollers may be adjusted to vary their peripheral inclination. This is accomplished by loosening the nuts 21 and 15 and by vertically adjusting either shaft 4 on its horizontal pivot 13 within the limits of the slot 17 the pitch of the wrist-pin 11 can be regulated to vary the transverse peripheral inclination of the roller to offset the biased tendency of the blade.

What I claim is:—

1. In a band saw including an endless blade carried by pulleys, means for tensioning the blade on the pulleys comprising a rotatable shaft provided with an eccentric bearing extending transversely of the blade, and a roller journaled on the eccentric bearing and operating to bear against the blade so that rotation of the shaft turns the eccentric bearing to vary the pressure of the roller on the blade to regulate the tension of said blade.

2. In a band saw including an endless blade carried by pulleys, means for tensioning the blade on the pulleys comprising a rotatable shaft pivotally mounted at its inner end adjacent to the travel of the blade, a pin projecting from the inner end of the shaft and extending transversely across the blade, said pin being parallel to the axis of the shaft and eccentric thereto, and a roller journaled on the eccentric bearing provided by the pin and operating to bear against the blade so that the angular displacement of the shaft on its pivotal mounting and the rotation of the shaft about its axis operates to vary the pressure of the roller on the blade to regulate the tension of said blade.

3. In a band saw including an endless blade carried by pulleys, means for tensioning the blade on the pulleys comprising a support, a sleeve pivotally mounted on the support adjacent to the travel of the blade between the pulleys, a rotatable shaft journaled adjacent its inner end in said sleeve to be angularly adjusted at its outer end by the turning of the sleeve on its pivot, a pin projecting from the inner end of the shaft to provide a bearing eccentric to the axis of said shaft, and a roller journaled on the eccentric bearing formed by the pin and operating to bear against the blade so that angular adjustment of the shaft and rotation of the same turns the eccentric bearing to vary the pressure of the roller on the blade to regulate the tension thereof.

AXEL LAURENTZ EDWALL.